(12) United States Patent
Taha et al.

(10) Patent No.: US 10,902,303 B2
(45) Date of Patent: Jan. 26, 2021

(54) METHODS AND SYSTEMS FOR VISUAL RECOGNITION USING TRIPLET LOSS

(71) Applicant: HONDA MOTOR CO., LTD., Tokyo (JP)

(72) Inventors: Ahmed Taha, Hyattsville, MD (US); Yi-Ting Chen, Sunnyvale, CA (US); Teruhisa Misu, Mountain View, CA (US); Larry Davis, Potomac, MD (US)

(73) Assignee: HONDA MOTOR CO., LTD., Tokyo (JP)

( * ) Notice: Subject to any disclaimer, the term of this patent is extended or adjusted under 35 U.S.C. 154(b) by 74 days.

(21) Appl. No.: 16/254,344

(22) Filed: Jan. 22, 2019

(65) Prior Publication Data
US 2020/0234088 A1    Jul. 23, 2020

(51) Int. Cl.
| G06K 9/66 | (2006.01) |
| G06K 9/00 | (2006.01) |
| G06N 3/08 | (2006.01) |
| G06K 9/62 | (2006.01) |

(52) U.S. Cl.
CPC ........... G06K 9/66 (2013.01); G06K 9/00805 (2013.01); G06K 9/00825 (2013.01); G06K 9/6276 (2013.01); G06N 3/08 (2013.01)

(58) Field of Classification Search
CPC .. G06K 9/66; G06K 9/00805; G06K 9/00825; G06K 9/6276; G06N 3/08
See application file for complete search history.

(56) References Cited

U.S. PATENT DOCUMENTS

| 10,108,867 | B1 * | 10/2018 | Vallespi-Gonzalez | ................... G01S 17/89 |
| 2018/0165546 | A1 * | 6/2018 | Skans | ............... G06K 9/6234 |
| 2018/0204111 | A1 * | 7/2018 | Zadeh | ............... G06K 9/3233 |
| 2019/0012170 | A1 * | 1/2019 | Qadeer | ............ G06F 9/30134 |
| 2019/0318099 | A1 * | 10/2019 | Carvalho | ............ G06N 3/0454 |
| 2020/0026960 | A1 * | 1/2020 | Park | ................... G06K 9/6218 |
| 2020/0159871 | A1 * | 5/2020 | Bowen | ............. G06K 9/00362 |

OTHER PUBLICATIONS

Angelova, A., et al., "Efficient object detection and segmentation for fine-grained recognition", In Proceedings of the IEEE Conference on Computer Vision and Pattern Recognition, pp. 811-818, 2013.

(Continued)

*Primary Examiner* — MD K Talukder
(74) *Attorney, Agent, or Firm* — Arent Fox LLP

(57) ABSTRACT

Methods, systems, and computer-readable mediums storing computer executable code for visual recognition implementing a triplet loss function are provided. The method include receiving an image generated from an image source associated with a vehicle. The method may also include analyzing the image based on a convolutional neural network. The convolutional neural network may apply both a triplet loss function and a softmax loss function to the image to determine classification logits. The method may also include classifying the image into a predetermined class distribution based upon the determined classification logits. The method may also include instructing the vehicle to perform a specific task based upon the classified image.

20 Claims, 7 Drawing Sheets

(56) References Cited

OTHER PUBLICATIONS

Bourdev, L., et al., "Describing people: A poselet-based approach to attribute classification", In Computer Vision (ICCV), 2011 IEEE International Conference on, pp. 1543-1550, IEEE, 2011.
Branson, S., "Bird species categorization using pose normalized deep convolutional nets", arXiv preprint arXiv:1406.2952, 2014.
Chen, W., et al., "Beyond triplet loss: a deep quadruplet network for person re-identification", In The IEEE Conference on Computer Vision and Pattern Recognition (CVPR), vol. 2, 2017.
Cheng, D, et al. "Person re-identification by multi-channel parts-based cnn with improved triplet loss function", In Proceedings of the IEEE Conference on Computer Vision and Pattern Recognition, pp. 1335-1344, 2016.
Collins, B., et al., Towards scalable dataset construction: An active learning approach. In European conference on computer vision, pp. 86-98. Springer, 2008.
Cui, Y., et al., "Kernel pooling for convolutional neural networks", In CVPR, vol. 1, p. 7, 2017.
Deng, J., et al., "Imagenet: A large-scale hierarchical image database", In Computer Vision and Pattern Recognition, 2009, CVPR 2009. IEEE Conference on, pp. 248-255. Ieee, 2009.
Farrel, R., et al., "Birdlets: Subordinate categorization using volumetric primitives and pose-normalized appearance", In Computer Vision (ICCV), 2011 IEEE International Conference on, pp. 161-168. IEEE, 2011.
Fernando, B., et al., "Self-supervised video representation learning with odd-one-out networks", In CVPR, 2017.
Hadsell, R., "Dimensionality reduction by learning an invariant mapping", In null, pp. 1735-1742. IEEE, 2006.
He, K., et al., "Deep residual learning for image recognition", In Proceedings of the IEEE conference on computer vision and pattern recognition, pp. 770-778, 2016.
He, X., et al., "Tripletcenter loss for multi-view 3d object retrieval", arXiv preprint arXiv:1803.06189, 2018.
Hermans, A., et al., "In defense of the triplet loss for person re-identification", arXiv preprint arXiv:1703.07737, 2017.
Huang, C., et al., "Learning deep representation for imbalanced classification", In Proceedings of the IEEE Conference on Computer Vision and Pattern Recognition, pp. 5375-5384, 2016.
Huang, C., et al., "Local similarity-aware deep feature embedding", In Advances in Neural Information Processing Systems, pp. 1262-1270, 2016.
Huang, G., et al., "Densely connected convolutional networks", In CVPR, vol. 1, p. 3, 2017.
Jaderberg, M., et al., "Spatial transformer networks", In Advances in neural information processing systems, pp. 2017-2025, 2015.
Krause, J., et al., Fine-grained recognition without part annotations. In Proceedings of the IEEE Conference on Computer Vision and Pattern Recognition, pp. 5546-5555, 2015.
Krause, J., et al., "The unreasonable effectiveness of noisy data for fine-grained recognition", In European Conference on Computer Vision, pp. 301-320. Springer, 2016.
Li, Y., et al., "Improving pairwise ranking for multi-label image classification", In The IEEE Conference on Computer Vision and Pattern Recognition (CVPR), 2017.
Lin, T., et al., Bilinear cnn models for fine-grained visual recognition. In Proceedings of the IEEE International Conference on Computer Vision, pp. 1449-1457, 2015.
Lin, T., et al., Improved bilinear pooling with cnns. arXiv preprint arXiv:1707.06772, 2017.
Liu, M., et al., "Hierarchical joint cnnbased models for fine-grained cars recognition", In International Conference on Cloud Computing and Security, pp. 337-347. Springer, 2016.
Maji, S., et al., "Fine-grained visual classification of aircraft", arXiv:1306.5151, 2013.
Nilsback, M., et al., "Automated flower classification over a large number of classes", In Computer Vision, Graphics & Image Processing, 2008. ICVGIP'08. Sixth Indian Conference on, pp. 722-729. IEEE, 2008.
Ramanishka, V., et al., "Toward driving scene understanding: A dataset for learning driver behavior and casual reasoning", In CVPR, 2018.
Razavian, A., et al., "CNN features off-the-shelf: an astounding baseline for recognition", In Proceedings of the IEEE conference on computer vision and pattern recognition workshops, pp. 806-813, 2014.
Rippel, O., et al., "Metric Learning with Adaptive Density Discrimination", Nov. 2015.
Ristani, E., et al., "Features for multi-target multi-camera tracking and re-identification", arXiv preprint arXiv:1803.10859, 2018.
Sankaranarayanan, S., et al., "Triplet probalistic embedding for face verification and clustering", arXiv preprint arXiv:1604.05417, 2016.
Schroff, F., et al., "A unified embedding for face recognition and clustering", In Proceedings of the IEEE conference on computer vision and pattern recognition, pp. 815-823, 2015.
Simontan, K., et al., "Very deep convolutional networks for large-scale image recognition", arXiv preprint arXiv:1490.1556, 2014.
Su, C., et al., "Deep attributes driven multi-camera person re-identification", In European conference on computer vision, pp. 475-491, Springer, 2016.
Szegedy, C., et al., Going deeper with convolutions. In Proceedings of the IEEE conference on computer vision and pattern recognition, pp. 1-9, 2015.
Szegedy, C., et al., "Rethinking the inception architecture for computer vision", In Proceedings of the IEEE conference on computer vision and pattern recognition, pp. 2818-2826, 2016.
Taha, A., et al., "Two stream self-supervised learning for action recognition", Deep-Vision Computer Vision and Pattern Recognition Workshop, 2018.
Van Horn, G., et al., "Building a bird recognition app and large scale dataset with citizen scientists: The fine print in fine-grained dataset collection", In Proceedings of the IEEE Conference on Computer Vision and Pattern Recognition, pp. 595-604, 2015.
Wang, Y., et al., "Mining discriminative triplets of patches for fine-grained classification", In Proceedings of the IEEE Conference on Computer Vision and Pattern Recognition, pp. 1163-1172, 2016.
Wen, Y., et al., "A discriminative feature learning approach for deep face recognition", In European Conference on Computer Vision, pp. 499-515. Springer, 2016.
Yu, F., et al., "LSUN: Construction of a large-scale image dataset using deep learning with humans in the loop", arXiv preprint arXiv:1506.03365, 2015.
Zhang, N., et al., "Pose pooling kernals for sub-category recognition", In Computer Vision and Pattern Recognition (CVPR), 2012 IEEE Conference on, pp. 3665-3672. IEEE, 2012.
Zhang, N., et al., "Part-based r-cnns for fine-grained category detection", In European conference on computer vision, pp. 834-849. Springer, 2014.
Zhang, Y., et al. "Weakly supervised fine-grained categorization with part-based image representation", IEEE Transactions on Image Processing, 25(4):1713-1725, 2016.

\* cited by examiner

METHODS AND SYSTEMS FOR VISUAL RECOGNITION USING TRIPLET LOSS

TECHNICAL FIELD

The present disclosure generally relates to a visual recognition system using a triplet loss function and methods for using a visual recognition system using a triplet loss function.

BACKGROUND

Visual recognition of objects, humans, faces, road conditions, etc., may be helpful for applications such as automated driving and advance driving assist systems. In these applications, it may be beneficial to recognize different traffic participants and traffic situations, e.g., vehicles, pedestrians, cyclists, turning lanes, merges, intersection passes, and cross-walks, for decision making, risk assessment, and motion planning. On an automated driving platform, multi-modal sensory devices are commonly used. Cameras and light detection and ranging (LiDAR) are two common perception sensors. Images obtained from these devices contain a huge amount visual cues for recognition tasks. However, it may be difficult to accurately and efficiently determine and classify the traffic participants and traffic situations by visual recognition alone. In view of this, Convolutional Neural Networks (CNN) have been employed with software to help efficiently classify traffic participants and traffic situations images. However, many such processes of image classification still output classifications of images containing numerous errors.

In view of the foregoing, there may be ways to more accurately classify images, objects and traffic situations through visual recognition by also employing a triplet loss process. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the disclosure provides a method for image classification for automated driving. The method may include receiving an image generated from an image source associated with a vehicle. The method may also include analyzing the image based on a convolutional neural network. The convolutional neural network may apply both a triplet loss function and a softmax loss function to the image to determine classification logits. The method may also include classifying the image into a predetermined class distribution based upon the determined classification logits. The method may also include instructing the vehicle to perform a specific task based upon the classified image.

In one aspect, the disclosure provides a system for image classification for automated driving. The system may include a memory, and a processor coupled to the memory. The system may be configured to receive an image generated from an image source associated with a vehicle. The system may also be configured to analyze the image based on a convolutional neural network. The convolutional neural network may apply both a triplet loss function and a softmax loss function to the image to determine classification logits. The system may also be configured to classify the image into a predetermined class distribution based upon the determined classification logits. The system may also be configured to instruct the vehicle to perform a specific task based upon the classified image.

In another aspect, the disclosure provides a non-transitory computer-readable medium including instructions that when executed by a processor may cause the processor to receive an image generated from an image source associated with a vehicle. The non-transitory computer-readable medium including instructions that when executed by a processor may cause the processor to analyze the image based on a convolutional neural network. The convolutional neural network may apply both a triplet loss function and a softmax loss function to the image to determine classification logits. The non-transitory computer-readable medium including instructions that when executed by a processor may cause the processor to classify the image into a predetermined class distribution based upon the determined classification logits. The non-transitory computer-readable medium including instructions that when executed by a processor may cause the processor to instruct the vehicle to perform a specific task based upon the classified image.

These and other aspects of the disclosure will become more fully understood upon a review of the detailed description, which follows.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein, may include a connection by which entities are "operably connected," and is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
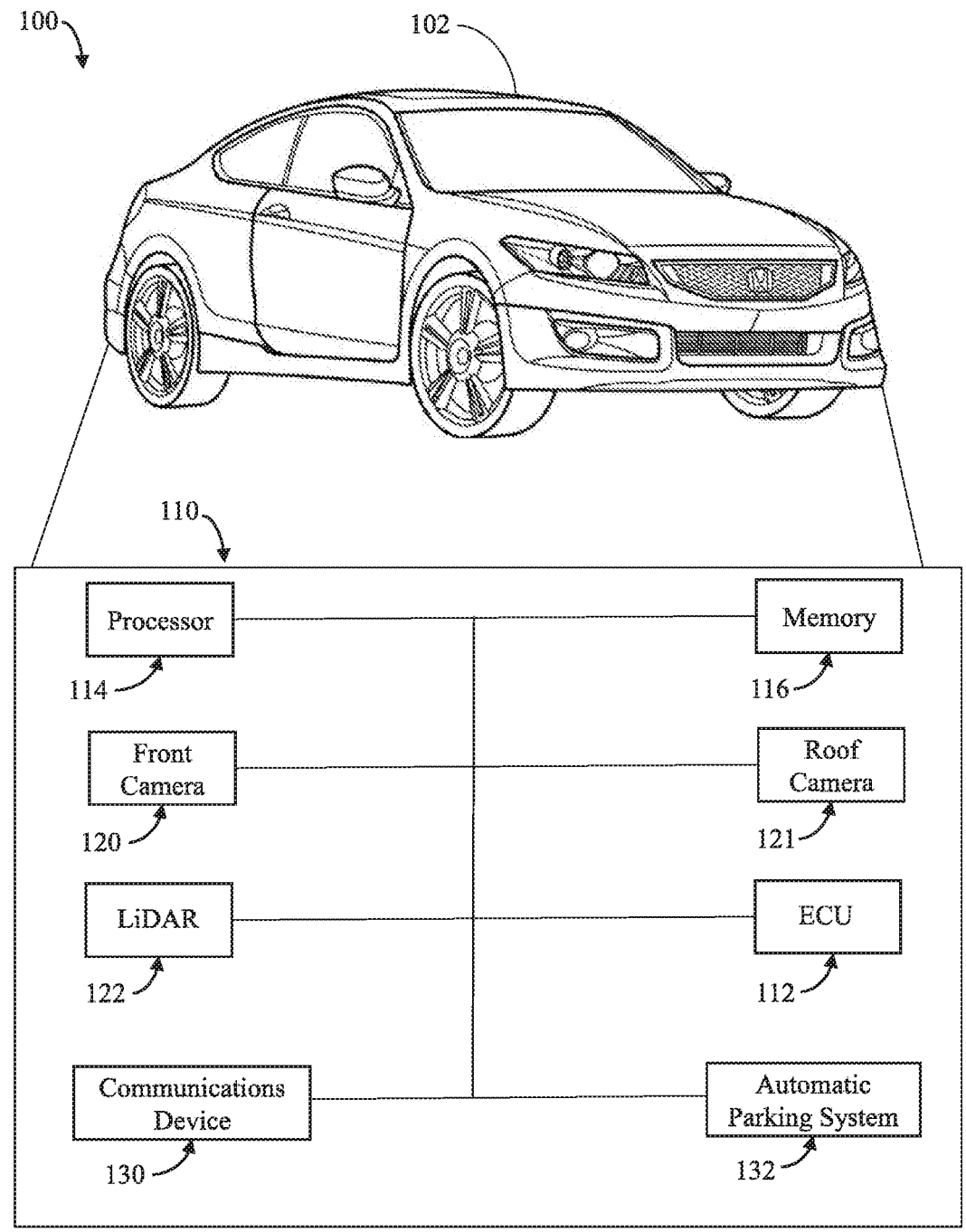
FIG. 1 illustrates a schematic view of an example operating environment of a system for object detection and visual recognition in accordance with aspects of the present disclosure.

Turning to FIG. 1, a schematic view of an example operating environment 100 of a visual recognition system 110 for object detection and visual recognition according to an aspect of the disclosure is provided. The visual recognition system 110 may reside within a vehicle 102. The components of the visual recognition system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the visual recognition system 110 including, among others, including vehicle HVAC systems, vehicle audio systems, vehicle video systems, vehicle infotainment systems, vehicle telephone systems, and the like. The visual recognition system 110 may include a front camera 120, a roof camera 121 or other image-capturing devices (e.g., a scanner) that may also be connected to the ECU 112 to provide images of the environment surrounding the vehicle 102, as described in further detail below. The visual recognition system 110 may also include a LiDAR sensor 122 that may capture a 3D point cloud image. The visual recognition system 110 may also include a processor 114 and a memory 116 that communicate with the front camera 120, the roof camera, LiDAR sensor 122, communications device 130, and automatic driving system 132.

The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the visual recognition system 110.

The vehicle 102 may further include a communications device 130 (e.g., wireless modem) for providing wired or wireless computer communications utilizing various protocols to send/receive electronic signals internally with respect to features and systems within the vehicle 102 and with respect to external devices. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications. For example, V2V communications may include wireless communications over a reserved frequency spectrum. As another example, V2V communications may include an ad hoc network between vehicles set up using Wi-Fi or Bluetooth®.

The vehicle 102 may include at least one of a front camera 120 and a roof camera 121. The cameras may be digital camera capable of capturing one or more images or image streams, or may be another image capturing device, such as a scanner. The cameras may provide an image of a space directly in front of the vehicle 102 or behind the vehicle. Other cameras may provide images of other spaces surrounding the vehicle 102. For example, the roof camera may be located on the roof and facing towards the rear of the vehicle or facing towards the front of the vehicle. The cameras 120 and 121 may provide the image or images to the automatic driving system 132 of the visual recognition system 110, and/or to a manufacturer system 230, described in FIG. 2, below. The automatic driving system 132 and the manufacturer system 230 will be discussed in detail below.

Figure 2:
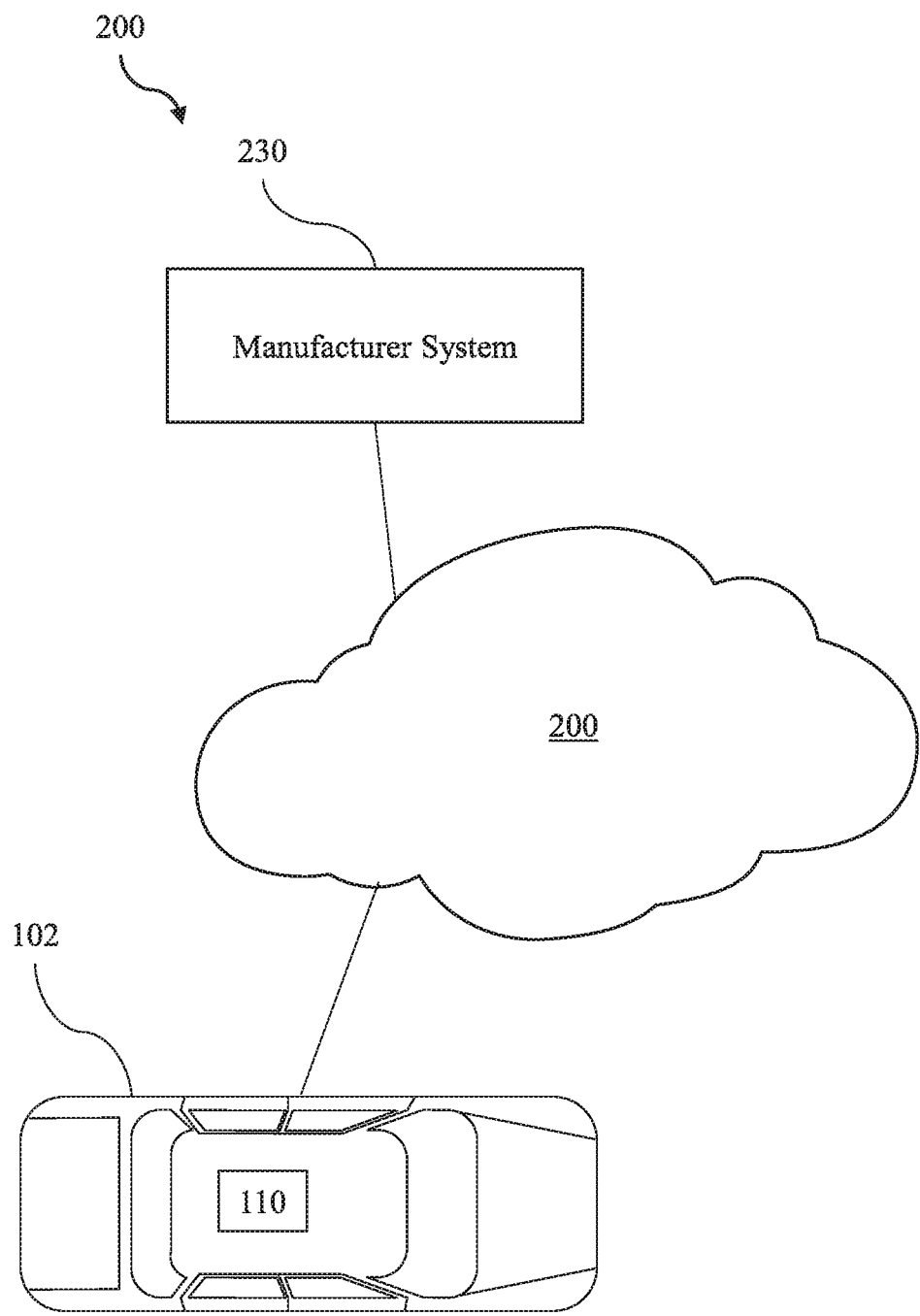
FIG. 2 illustrates a conceptual diagram illustrating a network in accordance with aspects of the present disclosure.

FIG. 2 illustrates an example network 200 for managing the visual recognition system 110. The network 200 may be a communications network that facilitates communications between multiple systems. For example, the network 200 may include the Internet or another internet protocol (IP) based network. The network 200 may enable the visual recognition system 110 to communicate with a manufacturer system 230.

The visual recognition system 110, within the vehicle 102, may communicate with the network 200 via the communications device 130. The communications device may, for example, transmit images captured by the front camera 120, roof camera 121, and/or the LiDAR 122 to the manufacturer system 230.

Figure 6:
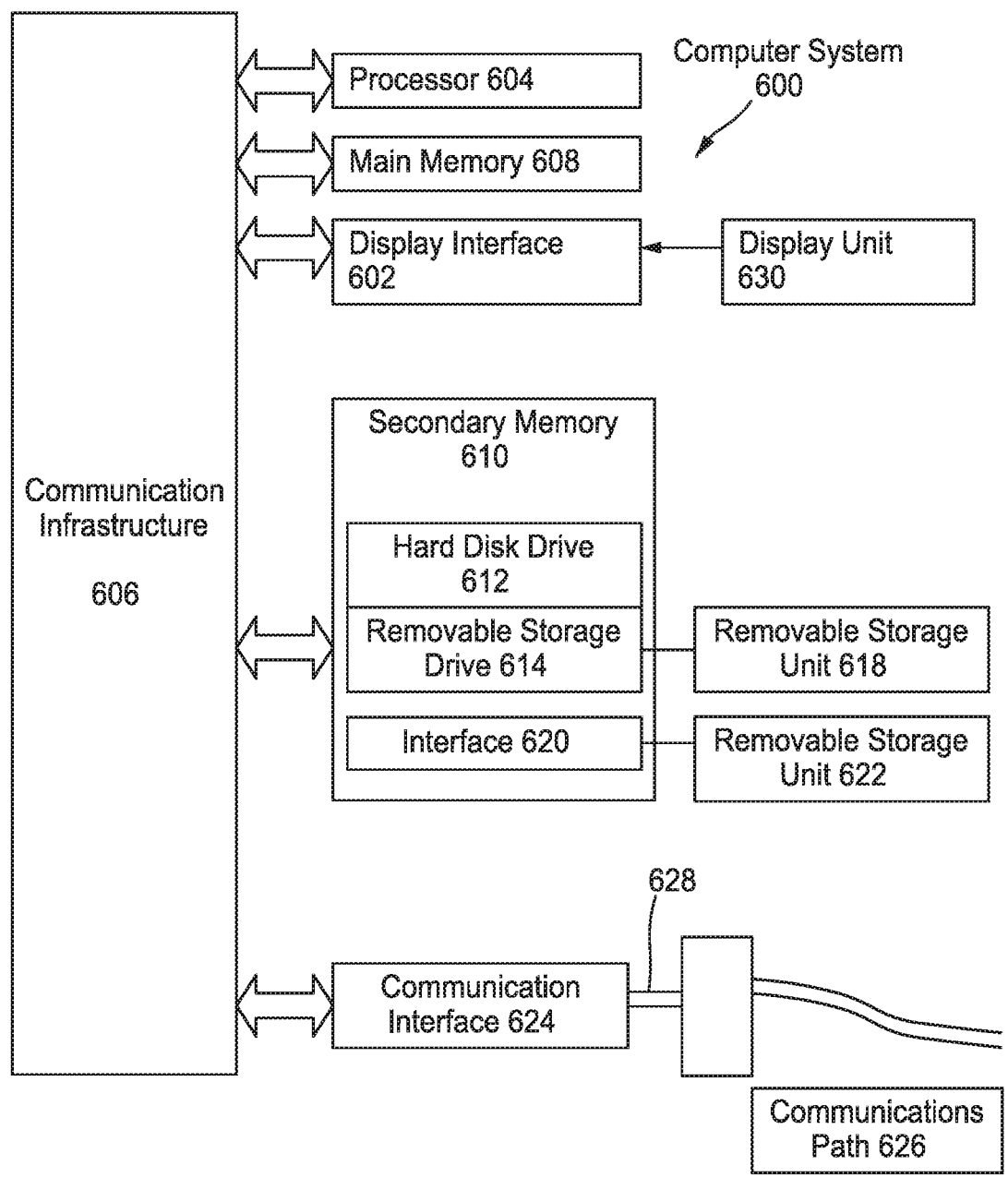
FIG. 6 presents an example system diagram of various hardware components and other features, for use in accordance with aspects of the present disclosure.

The manufacturer system 230 may include a computer system, as shown with respect to FIG. 6 and further described below, associated with one or more vehicle manufacturers, dealers or data centers. The manufacturer system 230 may include one or more databases that store data collected by the front camera 120, roof camera 121, and/or the LiDAR 122. The manufacturer system 230 may also include a memory that stores instructions for executing processes for performing instance segmentation and a processor configured to execute the instructions. Further, the manufacturer system may employ a CNN for testing, training and/or research.

The vehicle 102 may include an automatic driving system 132 for controlling the vehicle 102. The automatic driving system 132 may include a lane keeping assistance system, a collision warning system, or a fully autonomous driving system, among other systems. The automatic driving system 132 may receive object position and visual recognition from manufacturer system 230. In an aspect, the manufacturer system 230 may be a component of the automatic driving system 132.

In one aspect of the disclosure, the communications device 130 may transmit images captured by at least one of the front camera 120, the roof camera 121 and the LiDAR 122 to the manufacturer system 230 for classification based on standard CNN architectures in conjunction with a triplet loss function. The classification of the images may then be transmitted back to the vehicle 102 for processing by the automatic driving system 132.

In another aspect of the disclosure, the communications device 130 may transmit images captured by at least one of the front camera 120, the roof camera 121 and the LiDAR 122 to the automatic driving system 132 for classification based on standard CNN architectures in conjunction with a triplet loss function. The classification of the images may then be implemented by the automatic driving system 132.

CNNs may classify sections of an image or entire images presented that potentially contain an obstacle. Errors that may occur during the classification are fed back into the CNN for reclassification and further learning. After the analysis is complete and a final conclusion has been reached, the CNN outputs a signal for the vehicle to perform an action: keep driving, stop, turn, etc. In one aspect of the disclosure, a CNN may be employed comprising a softmax loss classification function in combination with a triplet loss function, to increase the accuracy of the image classification.

Visual recognition of an image was initially addressed with identifying Hard-Craft features. For example, Hand Craft features refer to properties derived using various algorithms using the information present in the image itself. For example, two simple features that may be extracted from images are edges and corners. A basic edge detector algorithm works by finding areas where the image intensity suddenly changes.

CNN approaches utilizing pose or part annotations aggregate motion and appearance information along tracks of human body parts. To eliminate extra annotations requirements, noisy web data could be leveraged to boost performance. Another similar process, which may be implemented to reduce annotation cost, is active learning.

To address both efficiency and accuracy of image classification, according to one aspect of the disclosure, utilizing pre-trained standard architectures, in conjunction with soft-max loss function and triplet loss embedding strength, may lead to achieving superior results for visual recognition.

Softmax loss for visual recognition may be presented in Equation 1 below:

$$L_s = -\sum_{i=1}^{m} \log \frac{e^{W_{y_i}^T x_i + b_{y_i}}}{\sum_{j=1}^{n} e^{W_{y_j}^T x_i + b_{y_j}}} \quad (1)$$

where $x_i \in R^d$ denotes the ith deep feature, belonging to the $y_i$th class. In standard architectures, $x_i$ is the prelogit layer with dimensionality d, the result is a flattening of the pooled convolutional features. $W_j \in R^d$ denotes the jth column of the weights $W \in R^{d \times n}$ the last fully connected layer and $b \in R^n$ is the bias term. m and n are the batch size and the number of class, respectively.

For balanced datasets, data augmentation and transfer learning, through pre-trained CNNs, may be implemented to increase efficiency. For example, the softmax loss forces samples from different classes to stay apart. Yet, inter-class margin maximization may be disregarded with the neural network overfitting capabilities. Thus, regularization losses to ensure class compactness may be implemented. For example, center loss may be implemented for better face recognition efficiency. Magnet loss may be implemented as a process that elevates the unimodality assumption imposed by center loss for fine-grained visual recognition. Triplet-center loss may be implemented to revert to unimodal embedding but may introduce a repelling force between classes centers, i.e. inter-class margin maximization.

Figure 3:
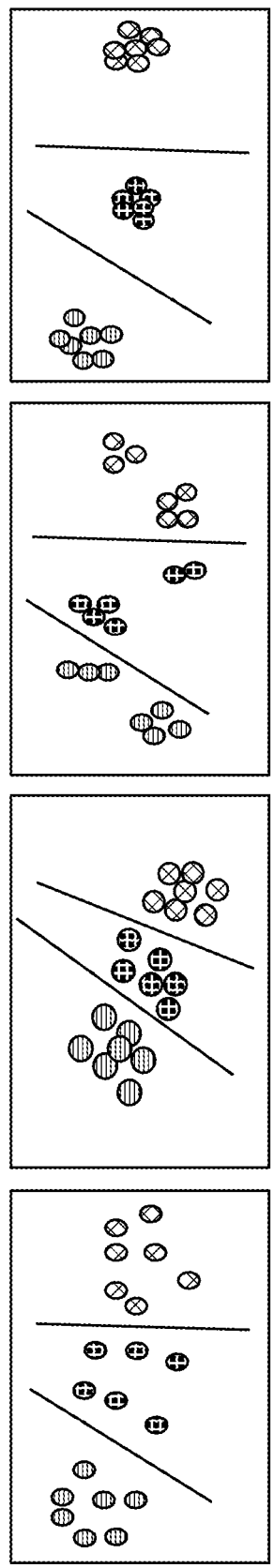
FIG. 3A illustrates an example visualization of a loss function in accordance with aspects of the present disclosure.
FIG. 3B illustrates an example visualization of a loss function in accordance with aspects of the present disclosure.
FIG. 3C illustrates an example visualization of a loss function in accordance with aspects of the present disclosure.
FIG. 3D illustrates an example visualization of a loss function in accordance with aspects of the present disclosure.

Turning to FIGS. 3A-3D, visualizations of the different losses objectives, as described above, are illustrated. As illustrated in FIG. 3A, softmax loss separates samples with neither class compactness nor margin maximization considerations. As illustrated in FIG. 3B, center loss promotes unimodal compact class representation. As illustrated in FIG. 3C, magnet loss supports multimodal embedding. As illustrated in FIG. 3D, triplet center loss attempts to achieve uni-model, margin maximization and class compactness.

In aspects of the disclosure, triplet loss may be combined with a softmax loss function and implemented with pre-trained CNN architectures to achieve state-of the-art results on various fine-grained visual recognition datasets with minimal hyper-parameter tuning, while incorporating semi-hard negative sampling. Through this combination, robustness on various recognition domains may be achieved.

Triplet loss may be utilized in a wide variety of implementations, for example, in face recognition and person re-identification. Triplet loss is a learning algorithm for artificial neural networks where a baseline (anchor) input is compared to a positive (truthy) input and a negative (falsy) input. The triplet is formed by drawing an anchor input, a positive input that describes the same entity as the anchor entity, and a negative input that does not describe the same entity as the anchor entity. These inputs are then run through the network, and the outputs are then used in the loss function. In one aspect of the disclosure the softmax loss function, from equation (1) described above, may be implemented with triplet loss function described below.

In both face recognition and person re-identification, triplet loss may be presented as a space embedding tool to measure the degree of similarity between objects and provide a metric for clustering. In an aspect of the disclosure, triplet loss may be presented as a classification regularizer.

While the pre-logits layer learns better representation for classification using softmax loss, triplet loss allows for a better space embedding. Equation (2) below shows the triplet loss function:

$$L_{tri} = \sum_{i=1}^{m} [(D(a, p) - D(a, n) + m)]_+ \quad (2)$$

where an image a (anchor) of a specific class may be pushed closer to all other images p (positive) of the same class than it is to any image n (negative) of any other class, thus enabling fast and robust integration. Further, triplet loss may be more efficient when compared to contrastive loss, and less computationally expensive than quadruplet and quintuplet losses. Equation (3) below, shows the final loss function while balancing hyperparameter λ.

$$L = L_{tri} + \lambda L_{tri} \quad (3)$$

Triplet loss performance may be dependent on a sampling strategy. In one aspect of the disclosure, a semi-hard sampling strategy may be employed. In semi-hard negative sampling, instead of picking the hardest positive-negative samples, all anchor-positive pairs and their corresponding semi-hard negatives may be selected. All anchor-positive pairs selection may be found to be more stable and converge slightly faster at the beginning of training.

Figure 4:
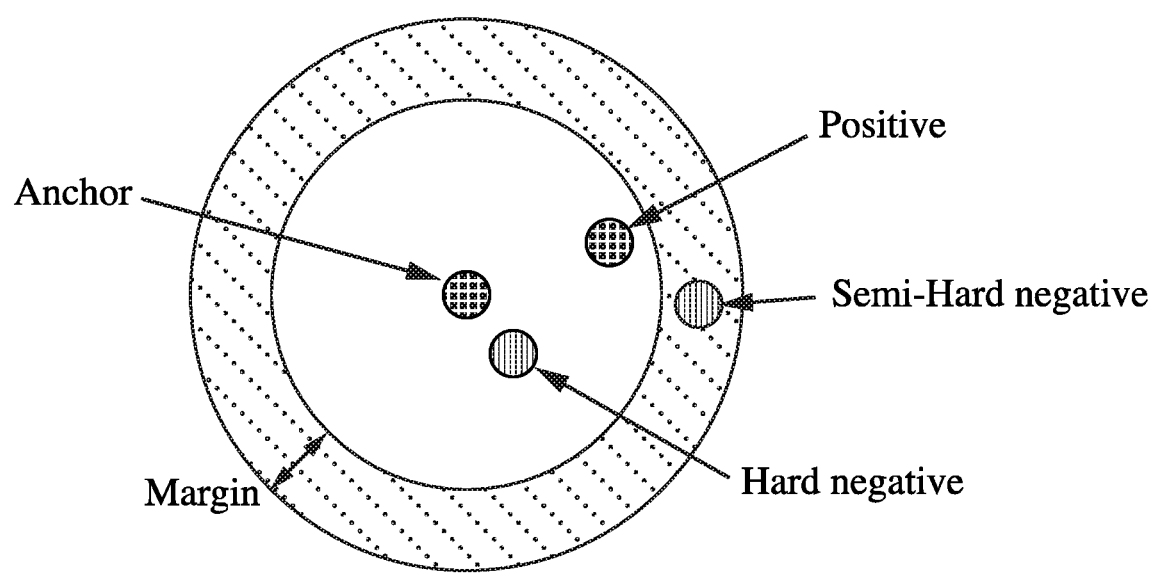
FIG. 4 illustrates example triplet loss sampling in accordance with aspects of the present disclosure.

Referring to FIG. 4, semi-hard negative exemplars are illustrated satisfying the constraints of the sampling. As illustrated, the exemplars are further away from the anchor than the positive exemplar, yet within the margin.

As described above, pre-trained networks may relax the large annotated dataset requirement, save training time and achieve better performance. As described above, losses, like center and triplet-center loss, waive such capabilities. Leveraging pre-trained standard architectures is one aspect of the present disclosure. Additionally, results are further improved through the use of implementing strong generic classifiers.

To integrate triplet loss, the convolutional layer may be flattened, applied another fully connected layer, pooled, then multiplied by a customizable fully connected layer to support various number of classifications. The fully connected layer $W_{emb}$ is applied in order to generate embeddings as illustrated in the equations (4) and (5) below:

$$\text{logits} = W_{logits} * \text{flat}(x_i) \quad (4)$$

$$\text{embedding} = W_{embed} * \text{flat}(h_i) \quad (5)$$

where $x_i = \text{pool}(h_i)$. Different embedding dimensionalities may be feasible by tuning the fully connected layer dimensions. The final embedding may be normalized to unit-circle and Euclidean distance metric may be employed. Triplet loss, applied on the embedding, may attract and repel samples from same and different classes, respectively. During inference, according to one aspect of the disclosure, both classification and retrieval applications may be enabled without overhead.

Figure 5:
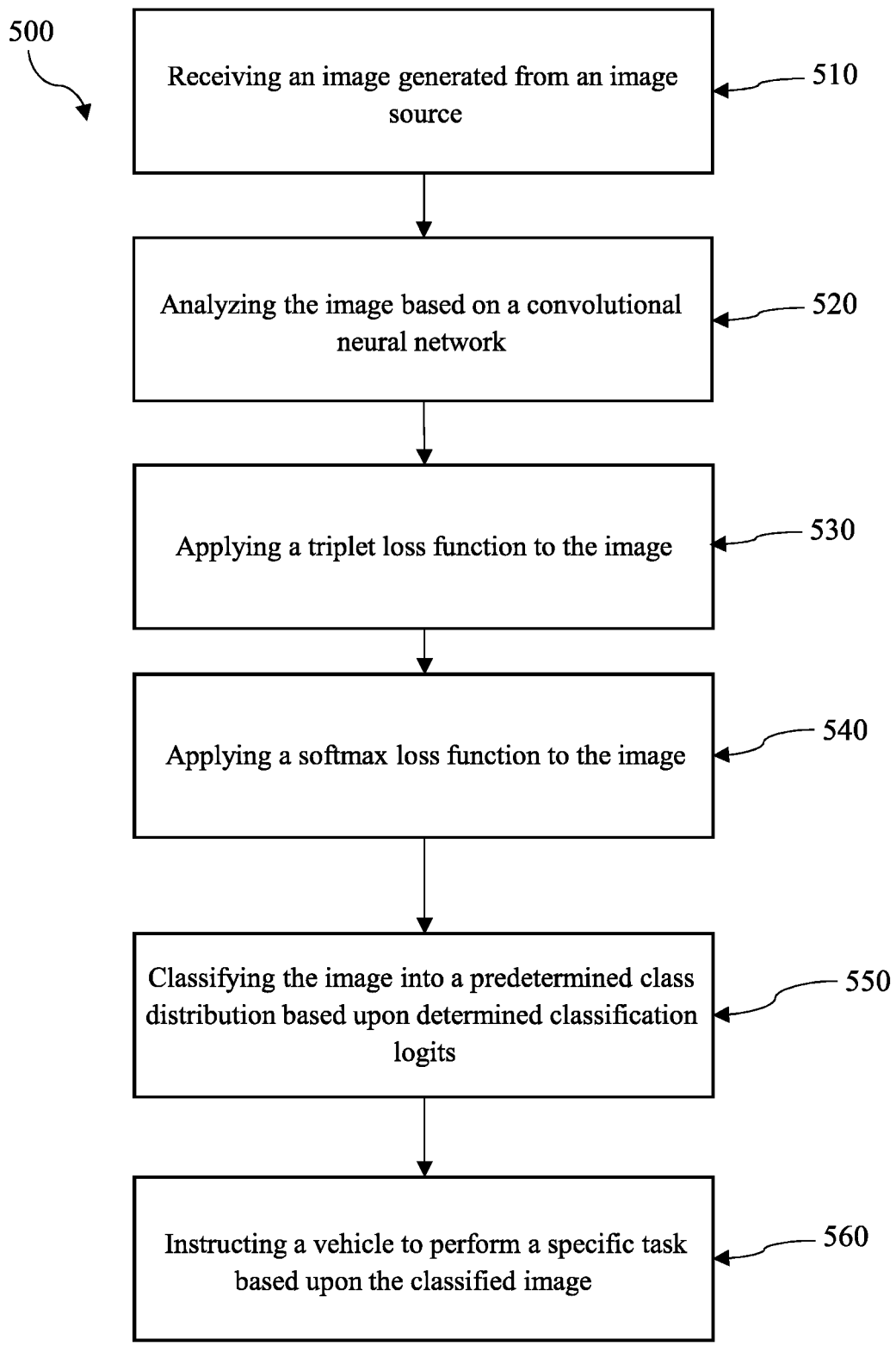
FIG. 5 illustrates a flowchart showing an example method of visual recognition and image classification in accordance with aspects of the present disclosure.

FIG. 5 illustrates a flowchart of an example method 500 for detecting and classifying objects by visual recognition, and making adjustments to a vehicle based upon classification of an image. The method 500 may be performed by an visual recognition system 110 within a vehicle 102 and/or to a manufacturer system 230.

At block 510, the method 500 may include receiving an image generated from an image source. For example, the image source may be at least one of the front camera 120, the roof camera 121, and the LiDAR 122. The image may also be received from other image generating devices.

At block 520, the method 500 may include analyzing the image based on a CNN. The CNN may be one of a pre-training network, for example Facenet, GoogleNet, ResNet-50, ResNet, DesneNet, imageNet, DenseNet161, or the like.

At block 530, the method 500 may include applying a triplet loss function, as described above, to the image. The triplet loss function may act as a classification regularizer for the input image classification.

At block 540, the method 500 may also include applying a softmax loss function, as described above, to the image. The softmax loss function may be implemented to determine classification logits. These classification logits may be used to determine the classification of an input image.

At block 550, the method 500 may include classifying the input image into a predetermined class distribution based upon determined classification logits. For example, in an aspect relating to autonomous vehicles, the image may be classified into any one of the class distributions, for example, Intersection Pass, Left Turn, Right Turn, Left Lane Change, Right Lane Change, Cross-Walk Passing, U-Turn, etc. In another example, regarding animals, the image may be classified into any one of the class distributions, for example, dog, cat, etc.

At block 560, the method 500 may include instructing an autonomous vehicle to perform a specific task based upon the classified input image. As described above, the task may be one of stopping, making a right turn, etc.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 6 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 600 is shown in FIG. 6.

Computer system 600 includes one or more processors, such as processor 604. The processor 604 is connected to a communication infrastructure 606 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 600 may include a display interface 602 that forwards graphics, text, and other data from the communication infrastructure 606 (or from a frame buffer not shown) for display on a display unit 630. Computer system 600 also includes a main memory 608, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to removable storage drive 614. As will be appreciated, the removable storage unit 618 includes a computer usable storage medium having stored therein computer software and/or data.

In alternative aspects, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628, which may be electronic, electromagnetic, optical or other signals capable of being received by communications interface 624. These signals 628 are provided to communications interface 624 via a communications path (e.g., channel) 626. This path 626 carries signals 628 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 680, a hard disk installed in hard disk drive 670, and signals 628. These computer program products provide software to the computer system 600. Aspects of the disclosure are directed to such computer program products.

Computer programs (also referred to as computer control logic) are stored in main memory 608 and/or secondary memory 610. Computer programs may also be received via communications interface 624. Such computer programs, when executed, enable the computer system 600 to perform various features in accordance with aspects of the present disclosure, as discussed herein. In particular, the computer programs, when executed, enable the processor 604 to perform such features. Accordingly, such computer programs represent controllers of the computer system 600.

In variations where aspects of the disclosure are implemented using software, the software may be stored in a computer program product and loaded into computer system 600 using removable storage drive 614, hard drive 612, or communications interface 620. The control logic (software), when executed by the processor 604, causes the processor 604 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 7:
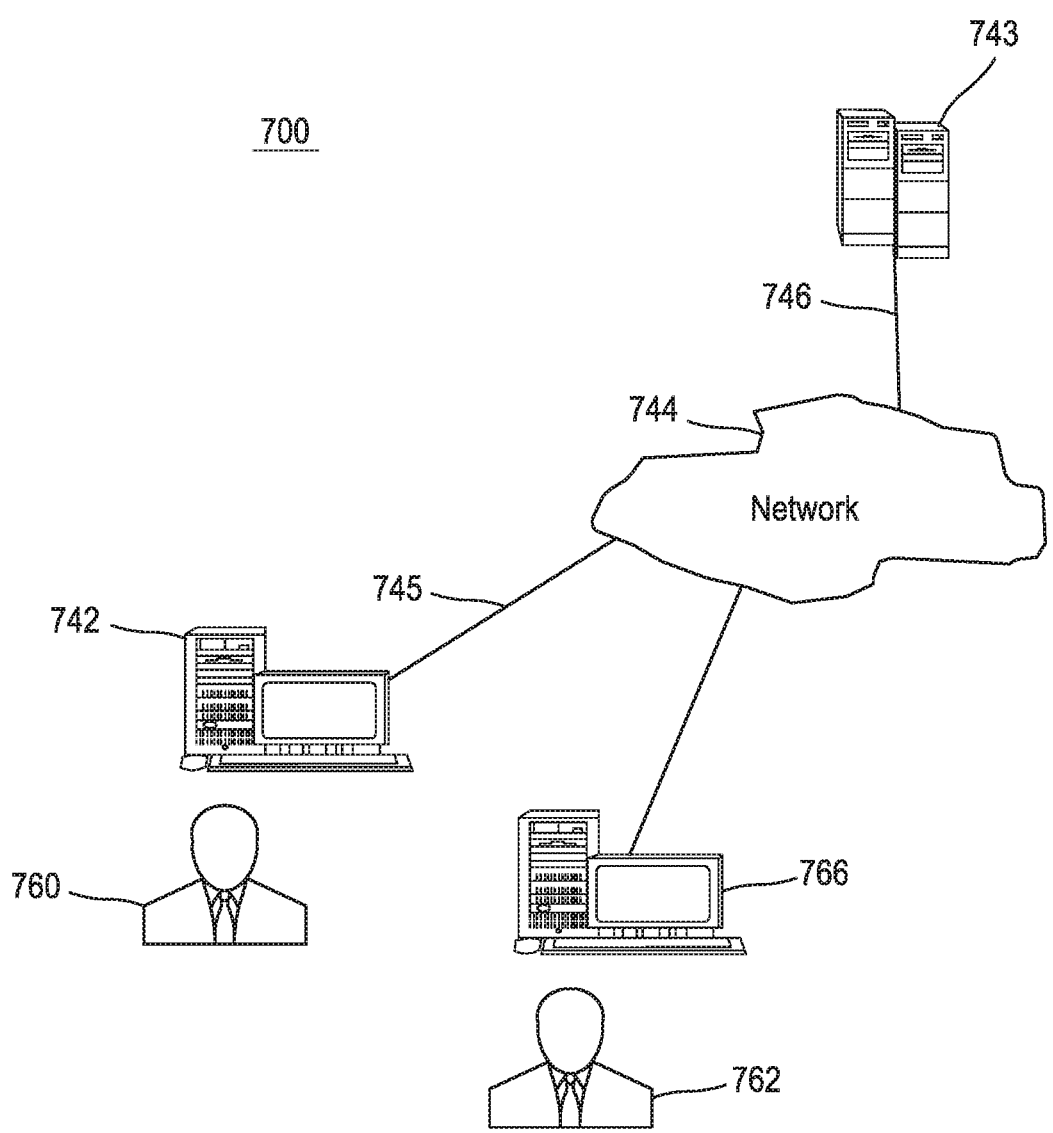
FIG. 7 is a block diagram of various example system components, for use in accordance with aspects of the present disclosure.

FIG. 7 is a block diagram of various example system components that may be used in accordance with aspects of the present disclosure. For example, the various components may be within the vehicle 102, or only some of the components may be within the vehicle 102, and other components may be remote from the vehicle 102. The system 700 includes one or more accessors 760, 762 (also referred to interchangeably herein as one or more "users") and one or more terminals 742, 766 (such terminals may be or include, for example, various features of the visual recognition system 110). In one aspect, data for use in accordance with aspects of the present disclosure is, for example, input and/or accessed by accessors 760, 762 via terminals 742, 766, such as personal computers (PCs), minicomputers, mainframe computers, microcomputers, telephonic devices, or wireless devices, such as personal digital assistants ("PDAs") or a hand-held wireless devices coupled to a server 743, such as a PC, minicomputer, mainframe computer, microcomputer, or other device having a processor and a repository for data and/or connection to a repository for data, via, for example, a network 744, such as the Internet or an intranet, and couplings 745, 746, 764. The couplings 745, 746, 764 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A method of image classification for automated driving comprising:
    receiving an image generated from an image source associated with a vehicle;
    analyzing the image based on a convolutional neural network;
        wherein the convolutional neural network applies both a triplet loss function and a softmax loss function to the image to determine combined classification logits;
    classifying the image into a predetermined class distribution based upon the determined combined classification logits; and
    instructing the vehicle to perform a specific task based upon the classified image.

2. The method of claim 1, wherein the convolutional neural network is a pre-trained architecture.

3. The method of claim 1, wherein the softmax loss function is represented by equation:

$$L_s = -\sum_{i=1}^{m} \log \frac{e^{W_{y_i}^T x_i + b_{y_i}}}{\sum_{j=1}^{n} e^{W_{y_j}^T x_i + b_{y_j}}}$$

where $x_i \in R^d$ denotes ith deep feature, belonging to the $y_i$th class, $x_i$ denotes a prelogit layer with dimensionality d, $W_j \in R^d$ denotes a jth column of weights $W \in R^{d \times n}$ for a last fully connected layer, $b \in R^n$ denotes a bias term, and m and n denote batch size and a number of classes respectively.

4. The method of claim 1, wherein the triplet loss function is represented by equation:

$$L_{tri} = \sum_{i=1}^{m} [(D(a, p) - D(a, n) + m)]$$

where the image a (anchor) of a specific class is pushed closer to all other images p (positive) of a same class than it is to any image n (negative) of any other class.

5. The method of claim 1, wherein the image source is a camera located on the vehicle.

6. The method of claim 1, wherein the triplet loss function regulates the classification of a plurality of images.

7. An image classification system for automated driving comprising:
a memory; and
at least one processor coupled with the memory and configured to:
receive an image generated from an image source associated with a vehicle;
analyze the image based on a convolutional neural network;
wherein the convolutional neural network applies both a triplet loss function and a softmax loss function to the image to determine combined classification logits;
classify the image into a predetermined class distribution based upon the determined combined classification logits; and
instruct the vehicle to perform a specific task based upon the classified image.

8. The system of claim 7, wherein the convolutional neural network is a pre-trained architecture.

9. The system of claim 7, wherein the softmax loss function is represented by equation:

$$L_s = -\sum_{i=1}^{m} \log \frac{e^{W_{y_i}^T x_i + b_{y_i}}}{\sum_{j=1}^{n} e^{W_{y_j}^T x_i + b_{y_j}}}$$

where $x_i \in R^d$ denotes ith deep feature, belonging to the $y_i$th class, $x_i$ denotes a prelogit layer with dimensionality d, $W_j \in R^d$ denotes a jth column of weights $W \in R^{d \times n}$ for a last fully connected layer, $b \in R^n$ denotes a bias term, and m and n denote batch size and a number of classes respectively.

10. The system of claim 7, wherein the triplet loss function is represented by equation:

$$L_{tri} = \sum_{i=1}^{m} [(D(a, p) - D(a, n) + m)]$$

where the image a (anchor) of a specific class is pushed closer to all other images p (positive) of a same class than it is to any image n (negative) of any other class.

11. The system of claim 7, wherein the image source is a camera located on the vehicle.

12. The system of claim 7, wherein the triplet loss function regulates the classification of a plurality of images.

13. A non-transitory computer-readable storage medium containing executable computer program code, the code comprising instructions configured to cause a computing device to:
receive an image generated from an image source associated with a vehicle;
analyze the image based on a convolutional neural network;
wherein the convolutional neural network applies both a triplet loss function and a softmax loss function to the image to determine combined classification logits;
classify the image into a predetermined class distribution based upon the determined combined classification logits; and
instruct the vehicle to perform a specific task based upon the classified image.

14. The computer-readable medium of claim 13, wherein the convolutional neural network is a pre-trained architecture.

15. The computer-readable medium of claim 13, wherein the softmax loss function is represented by equation:

$$L_s = -\sum_{i=1}^{m} \log \frac{e^{W_{y_i}^T x_i + b_{y_i}}}{\sum_{j=1}^{n} e^{W_{y_j}^T x_i + b_{y_j}}}$$

where $x_i \in R^d$ denotes ith deep feature, belonging to $y^i$th class, $x_i$ denotes a prelogit layer with dimensionality d, $W_j \in R^d$ denotes a jth column of weights $W \in R^{d \times n}$ for a last fully connected layer, $b \in R^n$ denotes a bias term, and m and n denote batch size and a number of classes respectively.

16. The computer-readable medium of claim 13, wherein the triplet loss function is represented by equation:

$$L_{tri} = \sum_{i=1}^{m} [(D(a, p) - D(a, n) + m)]$$

where the image a (anchor) of a specific class is pushed closer to all other images p (positive) of a same class than it is to any image n (negative) of any other class.

17. The computer-readable medium of claim 13, wherein the image source is a camera located on the vehicle.

18. The computer-readable medium of claim 13, wherein the triplet loss function regulates the classification of a plurality of images.

19. The method of claim 2, wherein the pre-trained architecture is one of Facenet, GoogleNet, ResNet-50, ResNet, DesneNet, imageNet, and DenseNet161.

20. The system of claim 8, wherein the pre-trained architecture is one of Facenet, GoogleNet, ResNet-50, ResNet, DesneNet, imageNet, and DenseNet161.

* * * * *